F. LIESCHE.
Apparatus for Making Coffee.
No. 55,509.
Patented June 12, 1866.
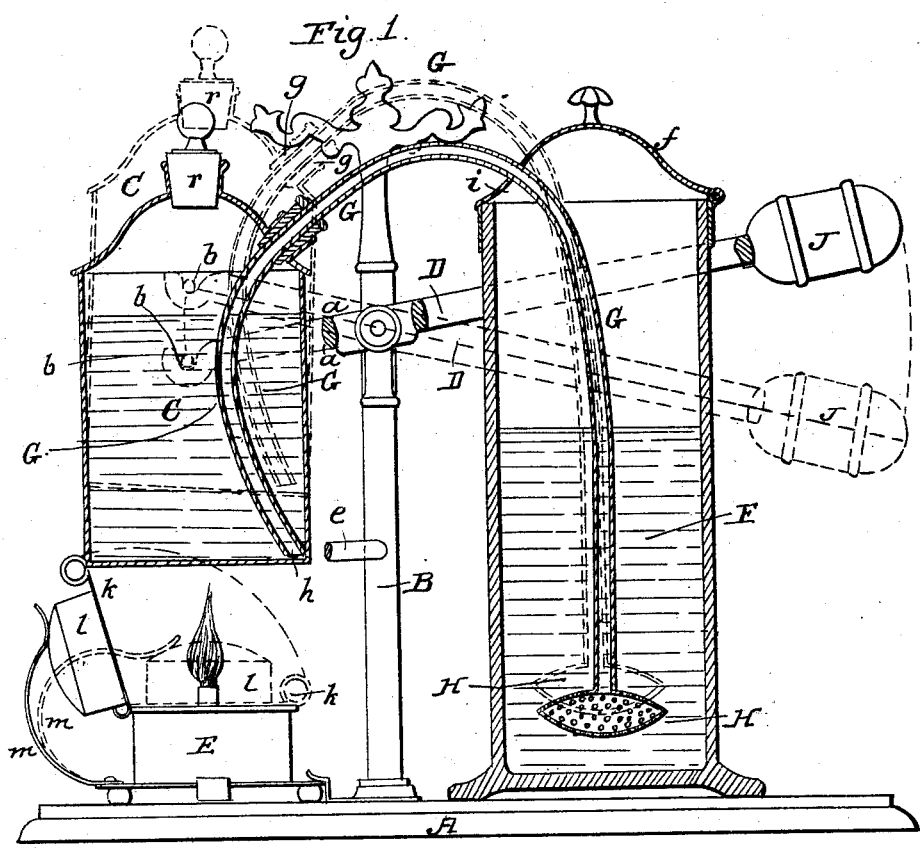
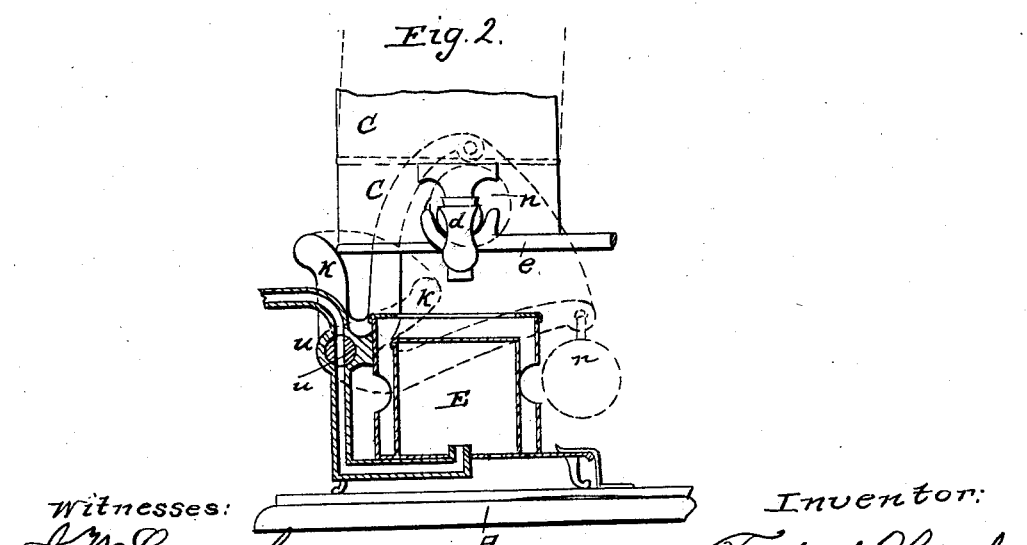

UNITED STATES PATENT OFFICE.

FREIDERICH LIESCHE, OF EAST NEW YORK, N. Y.

APPARATUS FOR MAKING COFFEE.

Specification forming part of Letters Patent No. 55,509, dated June 12, 1866.

*To all whom it may concern:*

Be it known that I, FREIDERICH LIESCHE, of East New York, in the county of Kings and State of New York, have invented a new and Improved Apparatus for Making Coffee; and I do hereby declare that the following is a full, clear, and exact description of the same, reference being had to the annexed drawings, making a part of this specification, in which—

Figure 1 is a central vertical section of my invention. Fig. 2 is a central vertical section, showing a modification of one feature of my invention.

Similar letters of reference indicate corresponding parts in both figures.

This invention is designed to operate automatically in making or infusing coffee; and it consists in a novel arrangement with regard to a lamp or other burner of a movable vessel suspended by a weighted tilting frame and connected with a stationary vessel by means of a curved tube and a strainer attached thereto, whereby water is first heated in the movable vessel, then passes into the stationary one to steep the coffee, and is thence drawn back into the movable vessel in the form of a clear infusion of coffee.

The invention further consists in a novel means of automatically extinguishing the lamp or burner by the movement of the movable vessel when the heated water has passed into the stationary one.

To enable others skilled in the art to understand the construction and operation of my invention, I will proceed to describe it with reference to the drawings.

A is a base-plate which supports the apparatus, and from the center of which there projects upward a vertical stem or standard, B.

D is a tilting frame or bar, which is pivoted near its center to the standard B, and one end of which is forked, as shown at $a$. In this forked end of the said frame is suspended a movable vessel, C, on each of the two parallel sides of which is a short spur or projection, $b$. These spurs fit into small notches or hooks in the extremities of the prongs of the said forked end of the frame D, and thus suspend the vessel C therefrom. This vessel C may be made of sheet metal, and is provided with an opening in the top, through which water is poured into the vessel, and which is closed by a tightly-fitting cork, $r$, or by any other suitable means.

Near the bottom of the faucet or stop-cock $d$, through which the liquid coffee is drawn from the vessel, and a rigid arm, $e$, extends horizontally from the standard B, and has its outer extremity so situated below the said faucet that the faucet will rest upon it while the water is being heated in the vessel C, the arm $e$ thus acting as a stop to prevent the vessel C from descending too far from the weight of water confined therein, as will be presently further explained.

Properly secured upon the base-plate A, under the vessel C, is a lamp or burner, E, by means of which the water in the vessel is made to boil.

Situated upon the opposite end of the base-plate A is an upright stationary vessel, F, which may be made of glass, and is provided with a lid or cover, $f$.

Firmly secured in one side of the movable vessel C, as shown at $g$, is a bent tube, G. That end of the said bent tube which is within the vessel C extends nearly to the bottom thereof, as shown at $h$, and the outer end of the said tube is passed through an opening, $i$, in the lid $f$ of the vessel F, and extends downward in the said vessel nearly to the bottom thereof, and is furnished at its extremities with a perforated metallic strainer, H.

That end of the frame D which is opposite the vessel C is made annular in shape, so that it can move up and down around the stationary vessel F, and is furnished at its extremity with a weight, $j$, which, when the vessel is empty, tilts the frame D and raises the said vessel C clear of the lamp or burner E.

As shown in Fig. 1, E represents a lamp, to one side of which is hinged or pivoted a lever, $k$, which has formed upon it an extinguisher, $l$, which is acted upon by a spring, $m$. When the lamp is uncovered to heat the water in the vessel C, the upper end of the lever $k$ rests against the lower edge of the said vessel, and when the vessel is raised up, as just set forth, the spring $m$ forces the lever over, and thus causes the extinguisher to descend upon the wick of the lamp and extinguish the flame.

In Fig. 2, E represents a gas-burner with the lever $k$ attached to the valve or stop-cock $u$ thereof, and is operated to shut off the gas from the burner, and thus extinguish the flame, when the vessel C is raised by means of a small weight, $n$. In this case two such levers $k$ may be employed, one rigidly attached to each end of the said valve of the gas-burner.

The operation of the apparatus in making coffee is as follows: A sufficient quantity of water being first poured into the vessel C to depress the said vessel until the faucet $d$ rests upon the arm $e$, as hereinbefore mentioned, the lamp or burner being lighted, and the lever $k$ raised up and resting against the lower edge of the vessel C, as shown in the drawings, and a proper quantity of ground coffee being placed upon the bottom of the vessel F, the heat of the flame first generates a small quantity of vapor upon the surface of the water in the vessel C, the said vapor passing through a minute orifice in the bent tube G, and through the said tube and its attached strainer H into the vessel F; but the water being soon brought to the boiling-point, a greatly-increased quantity of steam is generated, which, being unable to escape from the said vessel, presses downward upon the water and forces it into the bent tube G, through which and the strainer H it passes into the vessel F, where it is brought in contact with the coffee contained therein, and thus steeps the same. When the water has all been transferred in this manner from the vessel C to the vessel F, the vessel C is raised by the descent of the weight $j$, as shown in red lines in the drawings, and the lever $k$, being thus released, operates to extinguish the flame, as hereinbefore set forth. The consequent cooling of the vessel C condenses the steam therein, and thus produces a vacuum in the said vessel, on which the liquid coffee or infusion rushes back through the strainer H, which prevents the coffee-grounds from being carried along with and through the tube G into the said vessel C, from which it may be drawn through the faucet $d$.

What I claim as new, and desire to secure by Letters Patent, is—

1. The combination of the suspended vessel C, weighted frame D, curved tube G, strainer H, and stationary vessel F, the whole arranged with regard to a lamp or other burner substantially as herein set forth, for the purpose specified.

2. The lever $k$ and spring or weight $m\ n$, operating, in combination with the movable vessel A, to extinguish the lamp or burner when the said vessel is raised, in the manner substantially as herein set forth.

FREIDERICH LIESCHE.

Witnesses:
   J. W. COOMBS,
   W. MORRIS SMITH.